United States Patent [19]

Perego

[11] Patent Number: 5,125,587
[45] Date of Patent: Jun. 30, 1992

[54] TAPE LOADING CENTER

[75] Inventor: Luciano Perego, Mezzago, Italy

[73] Assignee: Tapematic U.S.A., Inc., Orlando, Fla.

[21] Appl. No.: 585,395

[22] Filed: Sep. 20, 1990

[30] Foreign Application Priority Data

Aug. 6, 1990 [IT] Italy .................. 21224 A/90

[51] Int. Cl.$^5$ .................. B65H 18/00; B65H 19/12; B65H 19/22
[52] U.S. Cl. .................. 242/56 R; 242/56.9; 242/58.6; 242/79
[58] Field of Search .................. 242/56 R, 57, 56.9, 242/58, 58.6, 79; 198/409

[56] References Cited

U.S. PATENT DOCUMENTS

| | | | |
|---|---|---|---|
| 3,207,286 | 9/1965 | Cozzoli | 198/409 |
| 4,139,165 | 2/1979 | Dyck | 242/56.9 |
| 4,175,999 | 11/1979 | Schoettle et al. | 242/56.9 |
| 4,332,355 | 6/1982 | Zopfy et al. | 242/56 R |
| 4,441,662 | 4/1984 | Seragnoli | 242/58 |
| 4,543,152 | 9/1985 | Nozaka | 242/57 |
| 4,629,138 | 12/1986 | Kubo | 242/56 R |
| 4,721,263 | 1/1988 | Miyazaki | 242/78.8 |
| 4,738,408 | 4/1988 | Odaka et al. | 242/56 R |
| 4,836,464 | 6/1989 | Perego | 242/56 R |

Primary Examiner—Daniel P. Stodola
Assistant Examiner—John Q. Nguyen
Attorney, Agent, or Firm—Edgar H. Haug; Adam L. Brookman

[57] ABSTRACT

The described cassette loading apparatus and method comprises a plurality of loading modules disposed consecutively in side-by-side relation and each provided with a loading station designed to engage individual cassettes and fill them with a predetermined amount of use tape taken from a respective pancake mounted on a support hub. A manipulating unit moving at the upper part of the machine removes the out of tape pancakes form the single hubs and replace them with new pancakes filled with use tape taken from a storage unit located laterally in side by side relation with the loading modules. Search and setup devices associated with the manipulating unit are designed to find and pick up the end of the use tape on a new pancake mounted to the hub and guide it in a predetermined path as far as it is operatively engaged in the corresponding loading station.

14 Claims, 7 Drawing Sheets

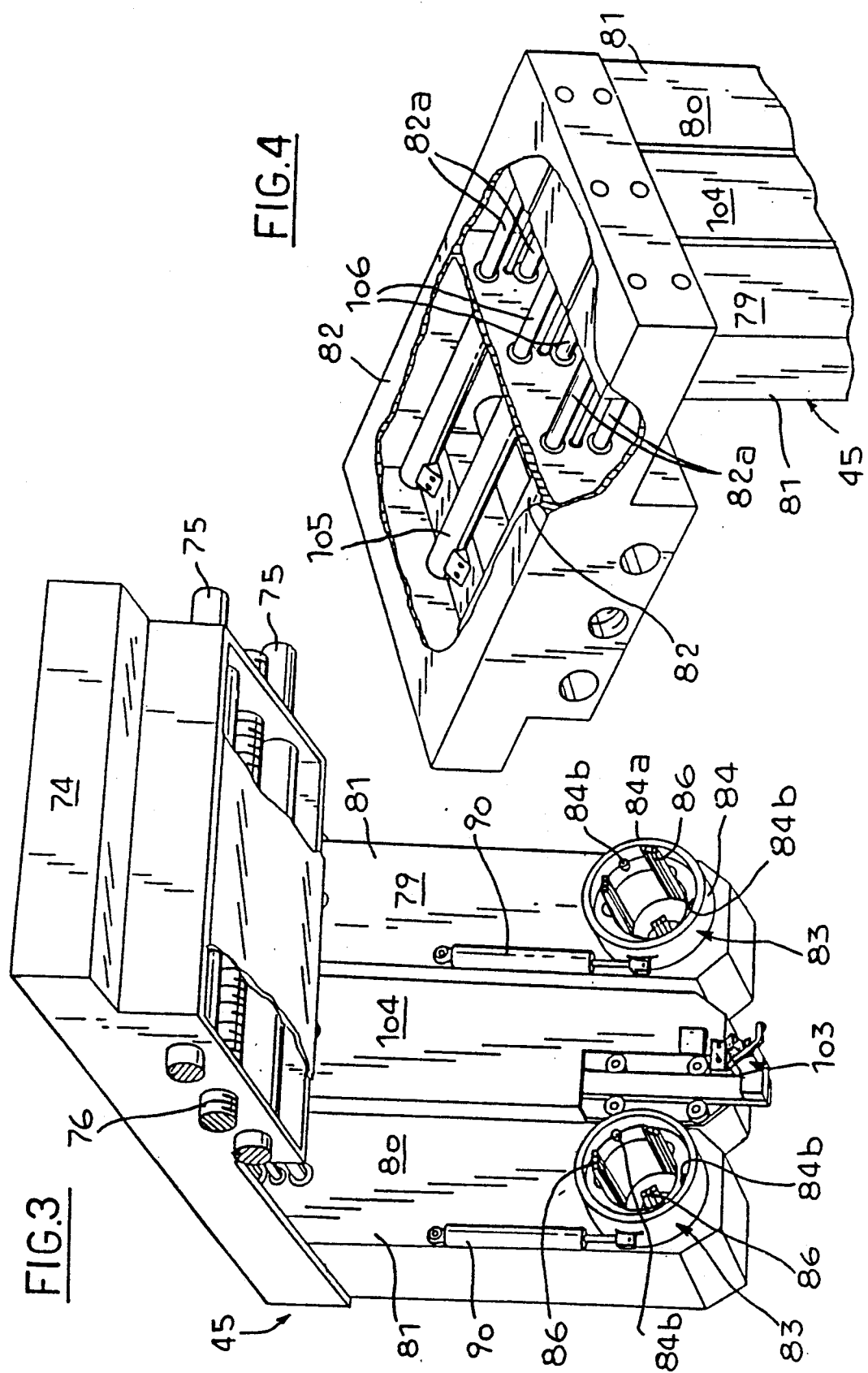

TAPE LOADING CENTER

BACKGROUND OF THE INVENTION

The present invention relates to an automatic cassette loading apparatus and method of the type comprising one or more loading modules provided with a support hub mounted to a front wall of the loading apparatus which is rotatably operable and designed to operatively engage a reel of magnetic tape (commonly referred to as a "pancake") through a coupling exhibited by said reel, and a loading station designed to engage individual cassettes to be loaded so as to wind a predetermined amount of magnetic tape from said pancake into said cassettes; supply means to individually send the cassettes to be loaded to the loading station; and receiving means to accept the loaded cassettes from the loading station.

Some of the aspects and elements used in the apparatus and method of the present invention are the object of other patent applications filed on the same date by the same applicant which are incorporated herein by reference.

PRIOR ART

It is known that the loading of tape cassettes, such as audio and/or video cassettes, is carried out by automatic machines substantially providing the presence of a loading station at which the individual cassettes are automatically taken from a supply magazine, are filled with a predetermined amount of use tape from a pancake which can be detachably mounted on a support hub. The loaded cassettes are then sent to a receiving magazine located at the base of the loading station.

While the machines in the prior art can certainly perform the tasks they have been entrusted with, problems and limitations arise when a very high productivity is required.

It is to be noted that the present state of the art loading machines are provided with a single loading station which is interlocked or cooperates to magazines or other mechanisms for supplying the cassettes to be loaded and receiving the loaded cassettes. Therefore, if a level of productivity requiring four loading stations is desired, it is necessary to set up four loading machines which will operate independently of one another. This would involve not only a relatively high cost for the purchase and start up of four individual loading machines but also requires considerable space in the loading factory for the installation and operation of the machines.

It is also important to appreciate that notwithstanding the relatively high degree of automation achieved by previously known loading machines, manual intervention by an operator is still required to supply a magazine with the cassettes to be loaded, to remove the loaded cassettes from the receiving magazine or means and to replace when necessary the depleted or empty pancakes on the support hub. This need for manual intervention in carrying out the above operations involves many difficulties when it is wished to entrust a single operator with the continuous operation of multiple loading machines. For example, to operate four separate loading machines would typically require two operators.

SUMMARY OF THE INVENTION

An object of the present invention is to provide a high speed completely automatic tape loading apparatus and method for loading use tape into a cassette.

A further object of the invention is to provide a tape loading apparatus and method whereby the need for manual intervention during any phase of the loading operation is completed obviated.

It is still a further object of the present invention to overcome problems of the prior art by providing a loading machine adapted to achieve increased productivity as compared to a series of individual loading machines of the known art while having reduced bulkiness and increased efficiency.

The foregoing and further objects will become more apparent by the following description. The objects of the present invention are achieved by an automatic machine for loading use tape into cassettes which includes a plurality of loading modules preferably disposed in side-by-side relation; a storage unit cooperating with said modules and detachably carrying a plurality of supply reels containing use tape and consecutively aligned according to an axis substantially in coplanar relation with the axis of the support hubs; a manipulating unit which is movable with respect to the lying plane of the support hub axis in a direction at right angles to the axis themselves; a grasping and release member associated with the manipulating unit and designed to remove tape out of a pancake from one of said hubs, pick up a filled pancake from the storage unit and place it onto said support hub in place of the empty one; search means designed to find the end of the tape wound onto the new pancake mounted on the support hub; setup means adapted to engage said tape end and guide it in a predetermined path as far as it is brought into operating engagement with the corresponding loading station.

BRIEF DESCRIPTION OF THE DRAWINGS

In the drawings:

FIG. 3 is a perspective view of a manipulating unit of which the only part facing the front wall of the machine of the invention is shown;

FIG. 4 is a perspective fragmentary view of the manipulating unit seen from the opposite side with respect to FIG. 3;

DESCRIPTION OF THE PREFERRED EMBODIMENT

Figure 1:
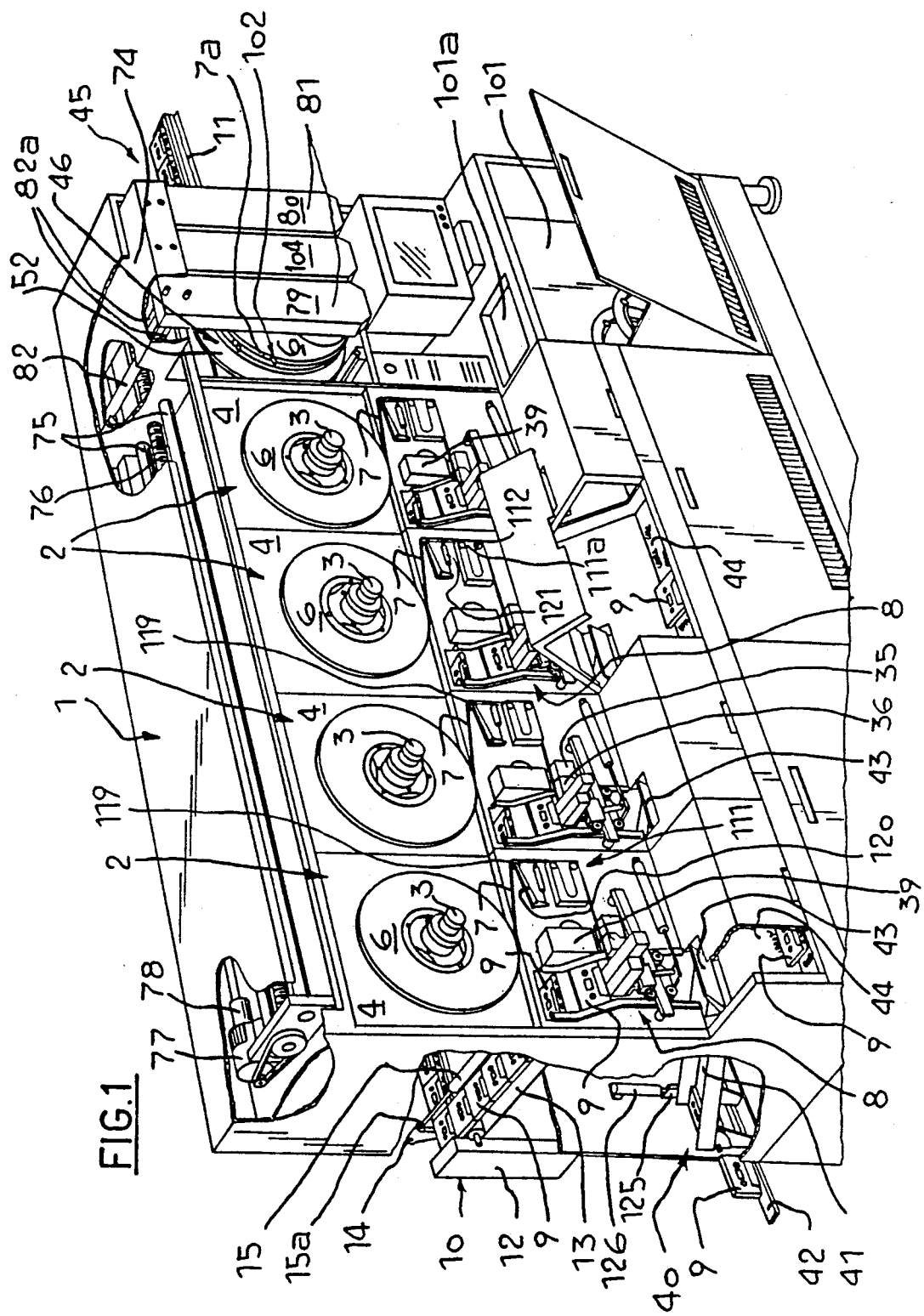
FIG. 1 is a perspective view of the apparatus of the invention.

Referring particularly to FIG. 1 a cassette loading machine in accordance with the invention has been generally identified by reference numeral 1.

Figure 8:
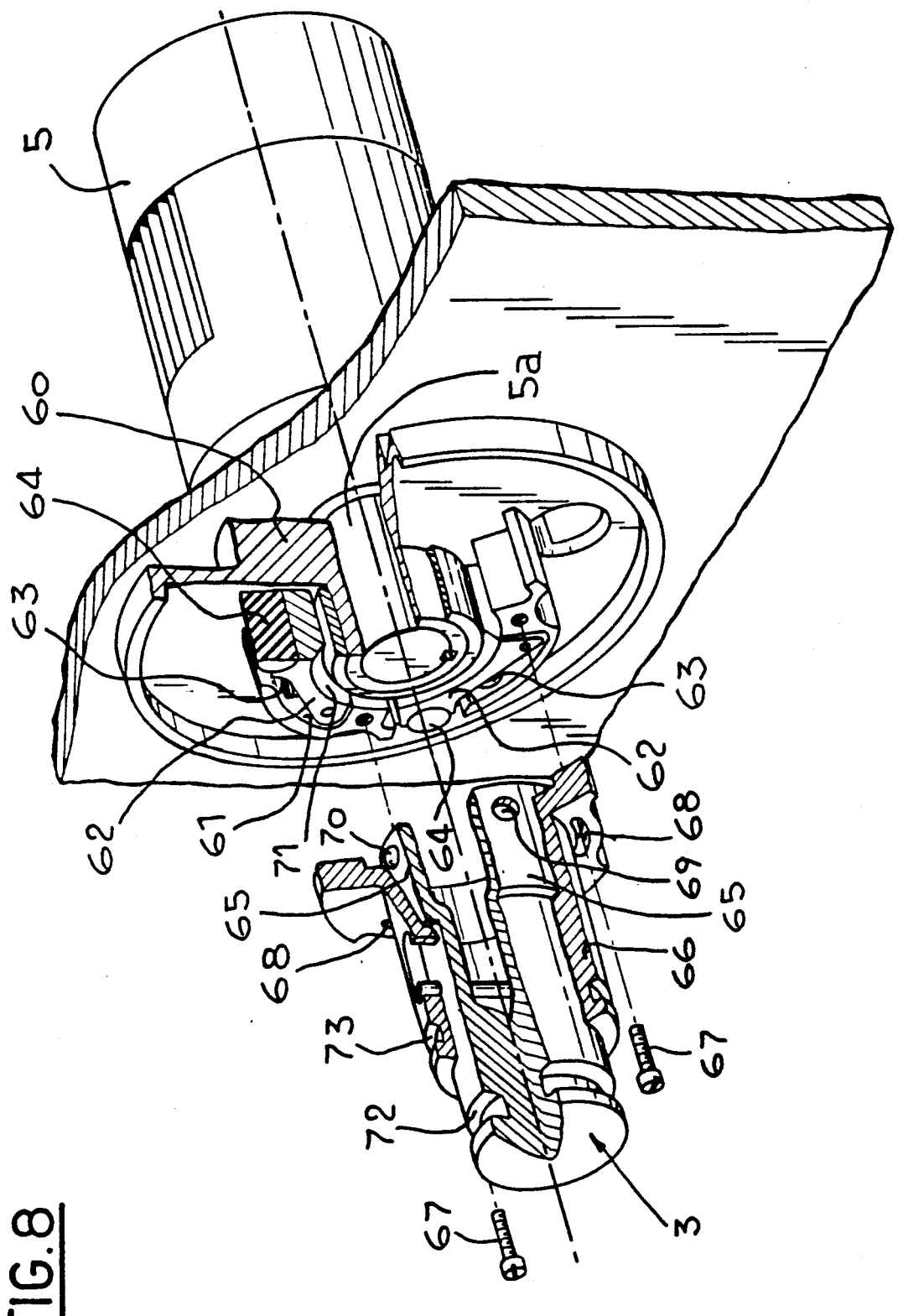
FIG. 8 is an exploded perspective view of one of the support hubs provided in the loading machine.

The loading machine comprises a plurality of loading modules 2 disposed consecutively in side by side relation and each carrying at least a support hub 3 operatively engaged with a front wall 4 of the loading machine 1 and operable in rotation upon command of a respective motor 5 (FIG. 8). Each support hub 3 is designed to removably engage a pancake 6 onto which the use tape 7 will be wound, which tape after following a predetermined path between different members associated with the respective loading module, will reach a loading station 8 where it is wound according to predetermined lengths into a plurality of cassettes 9 individually sent to the loading station by supply means 10.

The supply means 10 advantageously comprises a main belt conveyor 11 extending parallel to the alignment direction of the loading stations 8 and on which the cassettes 9 to be loaded are arranged consecutively in side by side relation. In greater detail, the cassettes 9, arranged on the main conveyor belt 111 by automatic supply devices not described as known and conventional are pushed by the movement of the conveyor itself against a stop partition 12 fastened to one side of the loading machine 1. In this manner each cassette 9 is moved towards the stop partition 12 as far as it is stopped against the latter or against the immediately preceding cassette. Should the conveyor belt 11 be completely filled with cassettes 9, it can be temporarily deactivated.

The supply means 10 further comprises a plurality of additional in-feed conveyors 13, preferably consisting of belt conveyors too, each of them extending perpendicularly from the main belt conveyor 11 as far as in the vicinity of one of the loading stations 8. Only one of said additional in-feed conveyors 13 is shown in FIG. 1 as the others are identical to the one shown.

Associated with each additional in-feed conveyor 13 is a pusher element 14 operatively engaging one of the cassettes 9 carried by the main belt conveyor 11 in order to transfer it onto the additional in-feed conveyor itself. To this end the pusher element 14 is fastened to one end of a rod 15a belonging to a fluid-operated actuator 15 so that said pusher element being acted upon by the actuator 15 is moved longitudinally to the additional in-feed conveyor 13, towards the respective loading station 8.

In the same manner as stated with reference with the main belt conveyor 11, each of the additional in-feed conveyors 13 is operated so that the cassettes 9 are constantly urged against a pair of front shoulders 16a (FIG. 2) offered by respective feed guides 16 extending substantially upright from the front wall 4 of the apparatus 1 and belonging to the loading station 8.

Figure 2:
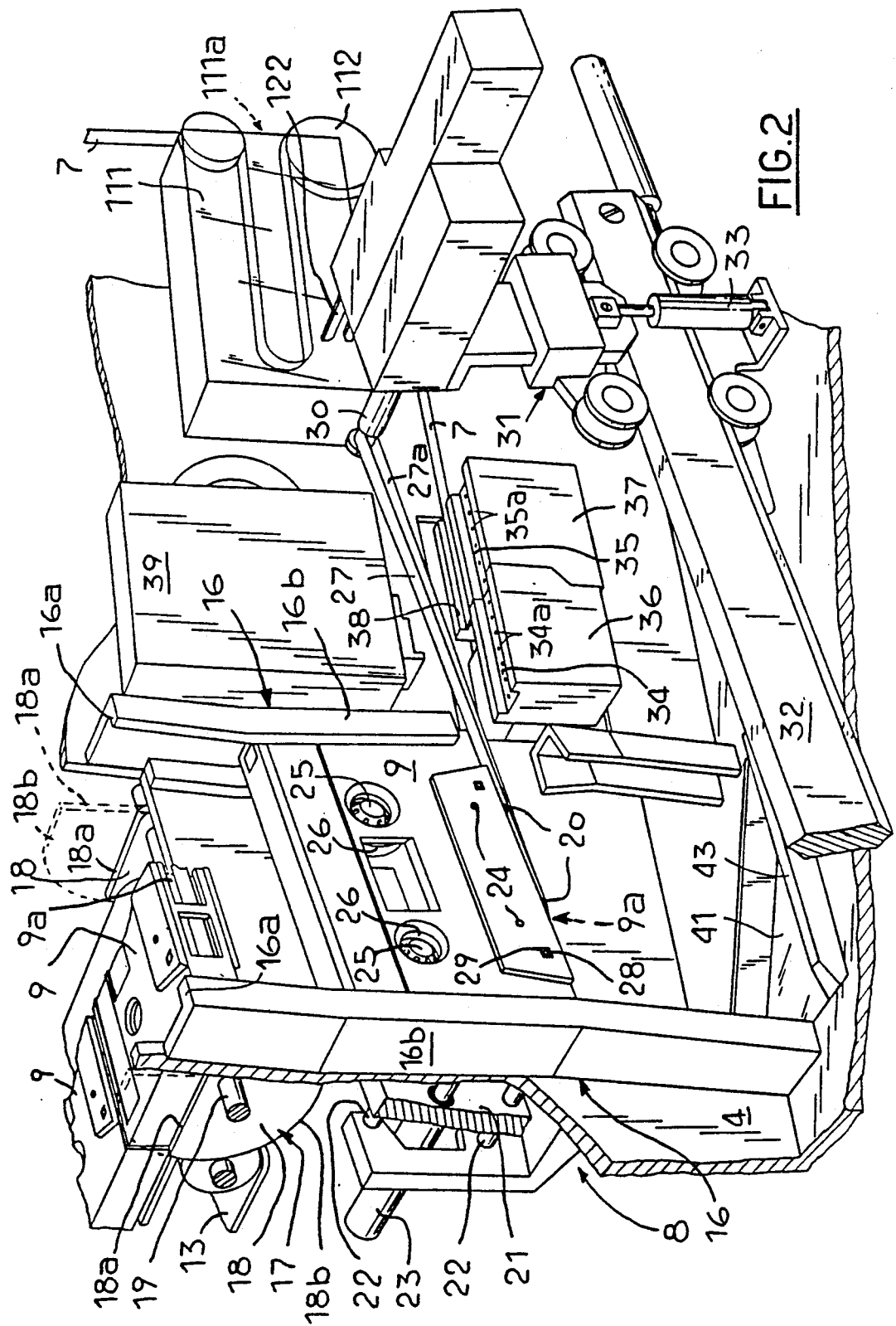
FIG. 2 is a perspective view of a loading station while a ribbon-like insert, commonly referred to as "leader", is extracted from a cassette, before the cassette loading operation begins.

A rotating member 17 acts between the respective additional in-feed conveyor 13 and the feed guides 16 in order to pick up the individual cassettes 9 from the conveyor itself and send them to the loading station 8. As shown in FIG. 2, the rotating member 17 essentially comprises a pair of elements in the form of sectors of a circle 18 fastened to a drive shaft 19 operable in rotation about a horizontal axes, for example upon command of a fluid-operated actuator (not shown) in order to bring the sector-shaped elements 18 from a waiting position in which their respective rectilinear edges 18a are in coplanar alignment with the additional in-feed conveyor 13 so as to sustain one of the cassettes 9, to an operating condition in which, by a rotation through 90°, the rectilinear edges are disposed in alignment with the feed guides 16 so that the cassette 9 drops down along said guides.

Advantageously the sector-shaped elements 18 also have curved edges 18b extending concentrically with the pivot axes of the drive shaft 19 and adapted to offer, in the above operating condition, an abutment housing for one of the cassettes 9, designed to engage on the rectilinear edges 18a when the sector-designed shaped elements come back to the waiting condition.

The cassette 9 engaged along the feed guides 16 falls down along the same, as far as it meets a pair of stop pegs 20 protruding from the front wall 4 of the loading machine. The stop pegs 20 can be retracted inside the front wall 4 upon command of fluid-operated actuators (not shown), for dropping the cassette 9 when the loading has been completed. The cassette 9 held in the loading station 8 by the stop pegs 20 is suitably positioned with the aid of a pair of centering points (not shown), fastened to a movement plate 21 slidably mounted on guide members 22 secured to the rear of the front wall 4. The plate 21 can be moved close to the front wall 4, upon command of one or more fluid-operated actuators 23, so that it can be brought from a rest position to an operating position in which said centering points engage into respective locator holes 24 conventionally provided in the cassette 9.

Preferably the fixed positioning of the cassettes 9 occurs in the region of the oblique portions 16b exhibited by the feed guides 16, so that the cassette can take a horizontal inclined orientation and its front opening 9a can face the use tape 7 to be loaded thereunto. In this way any risk of mechanical interference between the tape 7 and the front edges of the cassette 9 is eliminated during the loading step. The degree of inclination of the cassette 9 is typically in the range of 7° to 15°, and preferably should not exceed 10°.

The movement plate 21 also carries one or two winding spindles 25 which, when the plate is moved close to the front wall 4, engage into two winding hubs 26 conventionally provided in the cassettes 9.

A leader 27 is located inside the cassette 9 to be loaded, the opposite ends of said leader being secured to the winding hubs 26 respectively. A short portion of the leader 27 is extracted from the front opening 9a of the cassette 9 upon the action of a blowing nozzle 28 carried by the movement plate 21 and operating through a further hole 29 conventionally provided in the cassette itself. The short portion of leader 27 extracted from the opening 9a forms a loop which is entered, by a pin 30, as a result of an axial displacement controlled by an actuator. The extraction pin 30, mounted on a carriage 31 movable along a slide 32 fastened to the front wall 4, is shifted sideways relative to the cassette 9 thereby causing the leader 27 to be pulled from the cassette 9. Once the leader has been pulled out sufficiently, the pin 30 is lowered upon command of a further fluid-operated actuator 33, so that one portion of the leader and more precisely the portion located downwardly and identified by 27a in FIG. 2, may be laid into two rectilinear tracks 34, 35 formed on respective first and second support blocks, 36 and 37, disposed in mutual alignment. The portion 27a of the leader 27 which is held in the tracks 34, 35 by a suction action produced through the holes 34a, 35a opening into the track bottoms, is subsequently cut by a cutter mechanism (not shown), which is transversely movable between the blocks themselves.

At this point the second block 37 is shifted relative to the first block 36, in order to bring a feed track 38 carried by the second block 37 into alignment with the track 34 of the first block 36. Held in said feed track 38 is one end of the use tape 7 coming from the pancake 6 by the suction action produced through holes provided therein (not shown) (similar to holes 34a, 35a).

Both blocks 36, 37 are then simultaneously moved backward towards the front wall 4 to enable the execution of the splicing between the use tape 7 and the leader portion 27a carried by the first block 36, upon the action of a splicing unit 29. The splicing being carried out, the blocks 36, 37 are again moved away from the front wall 4 and one of the winding spindles 25 is operated in order to cause the use tape 7 to be wound, according to a predetermined amount, onto the corresponding winding hub 26 of the cassette 9. The winding being over, the use tape 7 is cut between the blocks 36, 37 by the above mentioned cutter mechanism. The second block 37 is moved so that it brings its respective track 35 still having in engagement the leader portion 27a cut by the first cutting operation, into engagement with the track 34 of the first block 36.

The blocks 36, 37 are again simultaneous moved backward towards the front wall 4, so that the opposite ends of the use tape 7 wound into the cassette 9 and the portion 27a of leader 27 are brought below the splicing unit 39 in order to enable the latter to carry out the splicing. By a new operation of the winding spindle 25 the winding of the use tape 7 and the corresponding leader 27 into the cassette 9 is completed.

The loaded cassette 9 is disengaged from the loading station 8 and is sent to receptor means 40 (FIG. 1) which automatically move it away from the loading machine 1, together with all other cassettes 9 coming from the loading stations 8 in the different modules 2. In greater detail, the disengagement of the cassette 9 takes place through the backward shifting of the movement plate 21.

The receptor means preferably comprises, in each loading station, a discharge chute 41 disposed underneath the corresponding loading station 8 and terminating in an out-feed belt conveyor 42 extending parallelly to the alignment direction of the loading modules 2. Preferably, between each loading station 8 and the corresponding discharge chute 41 there is a deflection plate 43 movable, upon command of one or more actuators not shown, from one position in which, as shown in FIG. 2, it obliquely projects upwardly from the front wall 4 to a second position in which it is disposed substantially in coplanar relation with the front wall itself. When the deflection plate 43 is in the first operating position, the cassettes 9 falling along the guides 16 are deviated towards the discharge chute 41. When the deflection plate 43 is in the second operating position the cassettes 9 are directly dropped down into a reception vessel 44 located under the corresponding loading station 8.

In order to prevent the cassettes 9 discharged from one of the loading modules 2 from accidentally falling onto the cassettes 9 previously discharged from the other loading modules 2 located upstream, a stop member 125 carried by a respective fluid-operated cylinder 126 can be advantageously provided at a point immediately upstream of the discharge chute 41. The stop member 125 can be positioned, after being enabled by one or more photoelectric cells not shown and located upstream of the stop member itself, on the out-feed conveyor 42 in order to stop the advancement of the cassettes 9 carried by the latter when a new cassette 9 must be discharged from the corresponding loading module 2.

It is obviously understood that the operations concerning the feeding of individual cassettes 9 to the loading station 8, the loading of the cassettes with the desired amount of use tape 7 and the transferring of the loaded cassettes to the out-feed conveyor 42, as above described with reference to a single loading module 2, take place in a completely identical manner in all loading modules 2 provided in the cassette loading machine 1.

In accordance with the present invention, the loading machine 1 further comprises a manipulating unit 45 which is operated each time one of the pancakes 6 mounted on the support hubs 3, through known and conventional sensor means is found to be out of use tape 7, in order to replace the empty pancake with a new pancake 6 filled with use tape 7 previously picked up from a storage unit 46.

Figure 6:
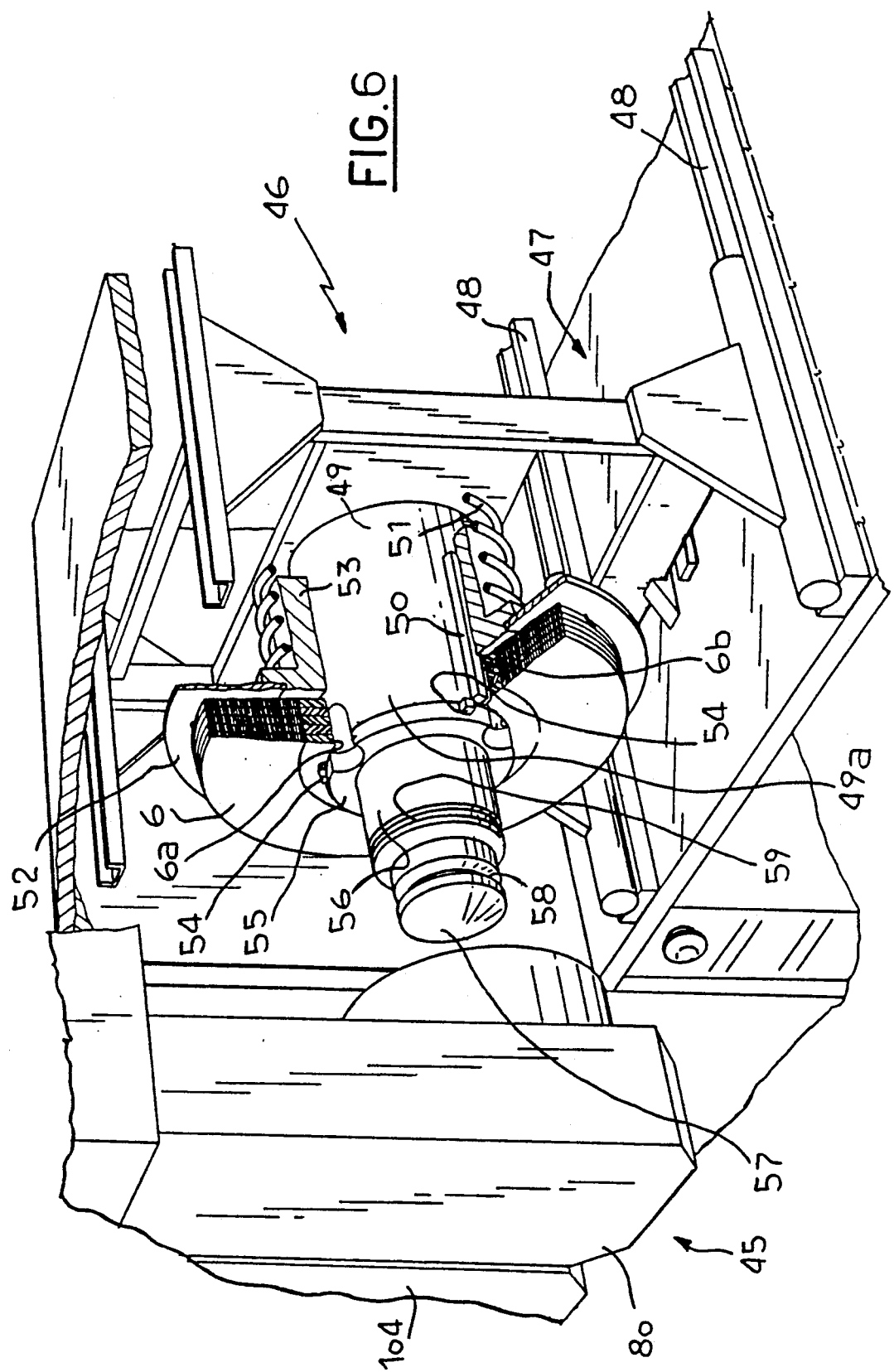
FIG. 6 is a fragmentary perspective view partly in section illustrating a storage unit designed to supply the manipulating unit with new pancakes filled with use tape.

Referring particularly to FIG. 6, the storage unit 46, disposed laterally in side by side relation and in horizontal alignment with the support hubs 3, comprises a support framework 47 detachably mounted, by human intervention or by automatic supply means, on slide rails 48 fixedly carried by the loading machine 1.

Fixedly mounted in cantilevered fashion on the support framework 47 is one guide sleeve 49 on which the pancakes 6 filled with use tape 7 are slidable engaged, through coupling openings 6a suitably provided therein. Longitudinally extending on said first guide sleeve 49 is one or more guide elements 50 slidably engaging into grip recesses 6b formed on the circumferential edge of said coupling opening 6a.

Due to the engagement of the guide elements 50 into the recesses 6b, the pancakes 6 are held against rotation while they can still slide axially on the first sleeve 49.

The pancakes are constantly pushed towards the front end 49a of the first sleeve 49 by a preload spring 51 operating between the support framework 47 and a pusher dish 52 directly acting on the pancakes themselves.

In the example shown, an annular connecting element 53 is located intermediate the spring 51 and the pusher dish 52.

Opposite the pusher dish 52 with respect to the pancakes 6 there is one or more pawls 54 interacting in abutment with the pancakes themselves in order to hold them axially locked on the first sleeve 49 against the action of the preload spring 51.

Pawls 54 are fixedly carried by a release collar 55 rotatably engaged onto a second guide sleeve 56 which is coaxially fastened to the front end 49a of the first sleeve 49 and exhibits an outer diameter smaller than the diameter of the first sleeve. The second guide sleeve 56 slidably engages, at the inside thereof, a drive shank 57 axially movable towards the first guide sleeve 49 against the action of a return spring not shown in the drawings. As can be seen, the drink shank 57 and guide sleeve 56 are preferably provided, close to the respective free ends, with circumferential grooves 58, 59 adapted to be engaged by drive means to be described in the following and designed to cause the axial movement of the drive shank 57.

As known from a parallel patent application filed in the name of the same Applicant, the drive shank 57 is held against rotation with respect to the second guide sleeve 56 and is provided with a drive peg slidably engaging in a helical groove formed within the release collar 55. In this way, when the drive shank 57 is axially pushed towards the first sleeve 49, the axial sliding of said drive peg causes an angular rotation of the release collar 55. As a result of the above angular rotation, pawls 54 are brought into alignment with the respective grip recesses 6b in the pancakes 6, so that one of said pancakes can slide on pawls 54 and be consequently disengaged from the storage unit 46.

Reference is now made to FIG. 8. In the cassette loading machine in reference each support hub 3 substantially comprises a core 60 connected to a shaft 5a of the drive motor 5 associated with the hub itself and designed to engage the corresponding pancake 6 in coaxial relation through the coupling opening 6a provided therein. Oscillatably pivoted to the core 60 in the region of respective housings 61, are three locking levers 62 circumferentially distributed at 120° from one another about the axes of the core itself and elastically urged against said axes by respective compression springs 63. Each locking lever 62 has, at one end, a retention element 64 preferably made of elastomeric material and adapted to exert a thrust action inside the coupling opening 6a in the pancake 6 so as to fix the positioning of said pancake on the support hub 3.

Associated with the core 60 is an actuator collar 65 held against rotation with respect to, but slidably housed inside, a guide collar 66 fixedly engaged on the core according to different angular positionings, by means of threaded elements 67 extending through curved slots 68 exhibited by the guide collar itself. The actuator collar 65 carries three balls 70 distributed at 120° about the axis of hub 3 and accommodated in respective radial holes 69, each of said balls being designed to act on an inclined surface 71 formed along the front edge of one of the locking levers 62. The action of said balls 70 on the inclined surfaces 71 causes, against the action of compression springs 63, the simultaneous moving away of levers 62 from the axis of the support hub 3 as a result of an axial movement of the actuator collar 65 towards the front wall 4.

The actuator collar 65 and guide collar 66 are also provided with circumferential grooves 72, 73 close to their respective free ends, which grooves can be engaged, as will be clarified in the following, by drive means adapted to cause the axial movement of the actuator collar itself.

Reference is now made to FIGS. 3 and 4. The manipulating unit 45 comprises a main carriage slidably mounted on guide bars 75 extending horizontally on top of the cassette loading machine 1. The main carriage 74 is movable in a direction at right angles to the axes of the hubs 3, upon command of a threaded rod 76 parallel to the guide bars 75 and operable in rotation by a driving motor 77 controlled by a conventional encoder 78. The encoder 78 is in communication with an electronic control box (or microprocessor) 120 on which the whole operating management of the cassette loading machine 1 relies.

Associated with the main carriage 74 is a discharge device 79 and a supply device 80 which are substantially identical and are respectively designed to remove an out of tape pancake 6 from the respective support hub 3 and to pick up a new pancake 6 filled with use tape 7 from the storage unit 46 and engage it on the hub itself. It will be recognized that the above operations can be also performed with the aid of only one of said devices but in that case the time involved for the pancake replacement will be longer.

Each discharge device 79 and supply device 80 comprises a support arm 81 extending vertically from the main carriage 74 and movable along transverse guide members 82a parallel to the axes of the support hubs 3, through a fluid-operated drive actuator 82 fastened to the main carriage itself.

Connected to the lower end of each of the support arms 81 is a grasping and release member 83 which, as best clarified in the following, as a result of the movement of the main carriage 74 and the respective support arm 81, can be operatively engaged with the support hub 3 and the storage unit 46 in order to pick up and lay down the pancakes 6.

Figure 7:
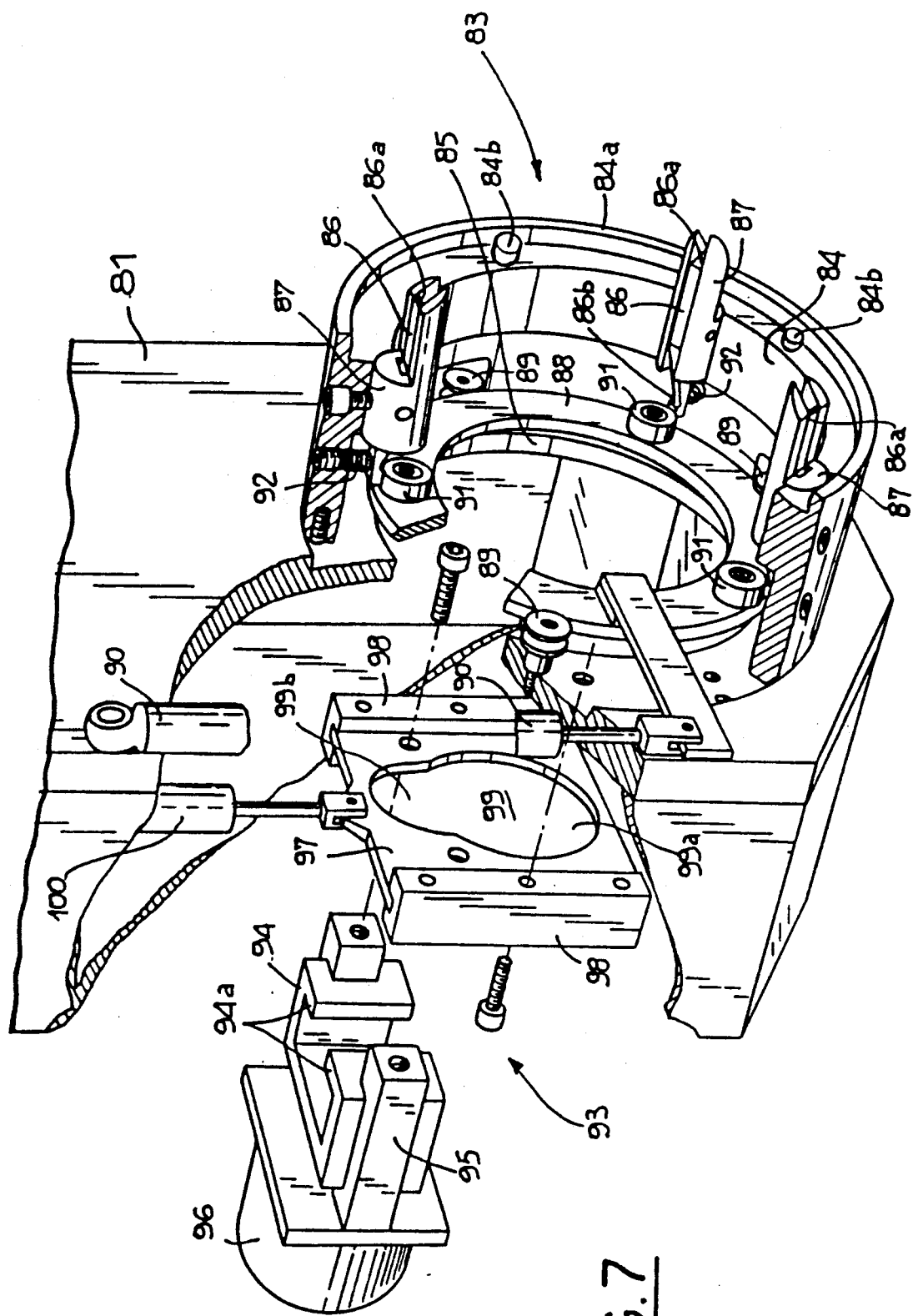
FIG. 7 is an exploded fragmentary view in perspective of a gripping member associated with the manipulating unit.

Referring particularly to FIG. 7, each of the grasping and release members 83 comprises a support collar 84 fastened to the support arm 81, in coaxial relation with an access opening 85 exhibited by the support arm itself. The support collar 84 is designed to come into coaxial engagement with the support hub 3 and the storage unit 46 when the corresponding support arm 81 is moved to the front wall 4.

The support collar 84 has a front edge 84a designed to offer a bearing seat for the individual pancakes 6 taken from the storage unit 46 and the support hub 3.

Oscillatably connected to the support collar 84 are at least three gripping levers 86, circumferentially distributed at 120° from one another relative to the axis of the collar itself. Each qrippinq lever 86 is oscillatably linked to the inner part of a guide block 87 fastened to a seat formed in the support collar 84. Each gripping lever 86 has one end 86a projecting forwardly from the support collar 84 so as to be fitted into the coupling opening 6a of the pancake 6 which must be picked up from the storage station 46 or from the support hub 3, as well as a second end 86b projecting outwardly from the guide block 87.

Coaxially housed within the support collar 84 is an actuator ring 88 rotatably supported by at least three guide rollers connected to the support arm 81 and circumferentially distributed about the access opening 85. The actuator ring 88 is operable in rotation according to a predetermined angle upon command of a fluid-operated cylinder 90 secured to the arm 81, and is provided with at least three projections 91, preferably consisting of thrust rollers rotatably engaged to the ring itself and distributed at 120° from one another. The thrust rollers 91 are designed to act on the second ends 86b of the gripping levers 86 for simultaneously moving said levers, against the action of return springs 92, from a gripping condition in which the first ends 86a of levers 86 are radially spaced apart form the axis of the support collar 84 to a release condition in which said first ends are moved close to the axis of the support collar 84, as shown in the accompanying drawings.

Also associated with each grasping and release member 83 is the drive means 93 designed to selectively act on the drive shank 57 of the storage unit 46 and/or the actuator collar 65 of the individual support hubs 3 thereby causing the axial movement of said shank and/or collar in order to carry out the engagement and disengagement of the pancakes 6.

Still referring to FIG. 7, the drive means 93 comprises a hooking element 94 provided with two faced hooking portions 94a. The hooking element 94 is slidably engaged on a guide block 95 and is movable parallelly to the axis of the support collar 84, upon command of an axial-movement actuator 96 secured to the guide block itself.

The guide block 95 is secured to a plate-like element 97 engaged to a pair of guide members 98 fastened to the inside of the arm 81. Preferably the plate-like element 97 is provided with a shaped opening 99 having an insertion portion 99a larger in width than the diametrical size of the second guide sleeve 56 belonging to the storage unit 46, as well as of the guide collar 66 belonging to the individual support hubs 3. Aligned with the insertion portion 99a parallelly to the movement of the plate like element 97, is a fitting portion 99b smaller in width than the insertion portion 99a and adapted to operatively engage with the circumferential grooves 59, 73 formed on the second guide sleeve 56 and the guide collar 66 respectively.

A radial-movement actuator 100 secured to the support arm 81 acts on the plate-like element 97 for radially moving it relative to the axis of the support collar 84, along with the hooking element 94. More specifically, following the operation of the radial-movement actuator 100, the hooking element 94 is moved from a rest position in which it is radially spaced apart from the axis of the support collar 84 to an operating position in which it is in coaxial alignment with the axis of the support collar. At the same time, the plate-like element 97 is moved from the rest position in which the insertion portion 99a of the shaped opening 99 is in coaxial alignment with the axis of the support collar 84, to an operating position in which the fitting portion 99b of said shaped opening is coaxially aligned with the axis of the collar itself.

During the normal running of the cassette loading machine 1, the manipulating unit 45 is positioned in from of the storage unit 46 in order to pick up and hold one of the pancakes 6 filled with use tape 7 by means of the supply device 80. For picking up said pancake 6 the grasping and release member 83 associated with the supply device 80 is brought into coaxial alignment, through the movement of the main carriage 74, with the storage unit 46 and is subsequently operatively engaged with the second guide sleeve 56, by moving the support arm 81 towards the front wall 4 of the cassette loading machine 1. During this step the drive shank 57 and the second guide sleeve 56 enter the insertion portion 99a of the shaped opening 99 offered by the plate-like element 97.

On operating the radial-movement actuator 100, the hooking element 94 and the plate-like element 97 are simultaneously brought to the working position so that they operatively engage with the circumferential grooves 58, 59 exhibited by the drive shank 57 and the second guide sleeve 56 respectively.

Then the axial-movement actuator 96 is operated and, by means of the hooking element 94, it axially urges the drive shank 57 towards the inside of the second guide sleeve 56. The axial movement of the drive shank 57 brings about an angular rotation of the release collar 55 and, as a result, the pawls 54 are brought into alignment with the guide elements 50 fastened to the first collar 49. Under this situation one of the pancakes 6 pushed by the preload spring 51 can leave the first guide collar 49 and abut the front edge 84a of the support collar 84.

At this point the drive shank 57 can be brought back to its primary position and disengaged from the hooking element 94 and the plate-like element 97. The gripping levers 86 still in the release position in order to enable their insertion in the coupling opening 6a of the picked up pancake 6, are brought to the gripping position by means of the return springs 92, following the deactivation of the fluid-operated cylinder 90 acting on the actuator ring 88. The pancake 6 held by the gripping levers 86 is definitively taken up from the storage unit 46 as a result of the support arm 81 being moved apart from said unit. This situation remains unchanged as far as one of the pancakes 6 mounted on the different support hubs 3 is detected to be out of use tape 7. Following the above detection, the manipulating unit 45, by the movement of the main carriage 74, is brought in front of the loading module 2 the pancake 6 of which needs to be replaced. The pancake 6 to be replaced is removed from the support hub 3 by the grasping and release member 83 associated with the discharge device 79 which, in the same manner as previously described with reference to the picking up of the pancake 6 from the storage unit 46, acts on the actuator collar 65 moving it axially apart from the front wall 4. Following the above movement, the locking levers 62 are urged, upon the action of the compression springs 63, towards the axis of the support hub 3 thereby disengaging the out of tape pancake which can be held by the gripping levers 86 of the discharge device 79 and removed from the support hub 3 when the support arm 81 is moved apart from the front wall 4.

A new movement of the main carriage 74 brings the grasping-release member 83 of the supply device 80 into alignment with the support hub 3 so as to engage the new pancake 6 filled with use tape 7 thereon, following a reverse operating sequence with respect to the one carried out by the discharge device 79.

The out of tape pancake 6 still held by the discharge device 79 will be dropped through an opening 101a into a receptor vessel 101 located underneath the storage unit 46 when the manipulating unit 45 is brought again in from of said storage unit. Preferably the disengagement of the pancake 6 takes place after the gripping levers 86 have been retracted to the release position, upon the action of one or more thrust pins 84b elastically introduced into the support collar 84.

Figure 5:
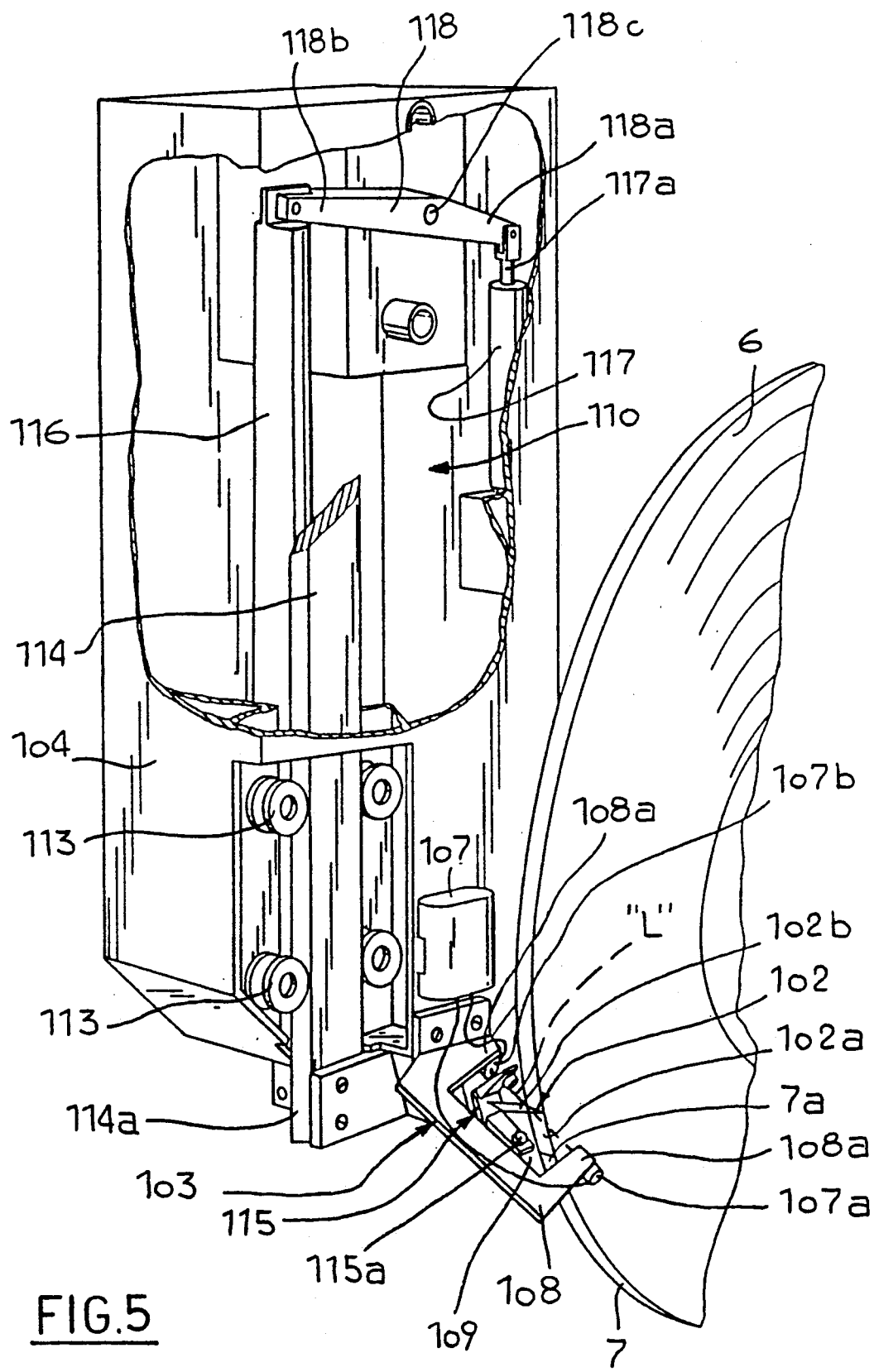
FIG. 5 is a perspective view of the search means and setup means associated with the manipulating unit shown in FIG. 3, while in operation on a pancake.

As shown in FIG. 1, each pancake 6 located in the storage unit 46 has one end 7a of the respective tape 7 fastened to the pancake 6 by a closure tab 102. More particularly, as best seen in FIG. 5, the closure tab 102 conventionally has an adhesive portion 102a by which the fastening of the end 7a to the pancake 6 is carried out, as well as a free portion 102b oriented outwardly to the pancake itself.

When the pancake 6 has been engaged on the respective support hub 3, the corresponding closure tab 102 can be randomly located at any point on the circumferential extension of the pancake itself. It is however necessary that said closure tab 102 be disposed according to a predetermined position so that its free portion 102b may be easily picked up, as best shown in the following, by setup means 110 adapted to guide the end 7a of the tape 7 in a predetermined path between the different members of the corresponding loading module 2, as far as said tape reaches the loading station 8.

In order to dispose the closure tab 102 in the desired position, search means is used which comprises a reading member 103 (FIG. 5) which is fastened at the lower part thereof to an additional support arm 104 extending vertically from the main carriage 74 and located between the support arms associated with the supply device 79 and the discharge device 80. The additional support arm 104 too is movable upon command of a fluid-operated actuator 105 along transverse guide bars 106 parallel to the axes of the pancakes 6 in order to move the reading member 103 from a rest position, in which it is axially spaced apart from the pancakes 6 so that it does not interfere with the support hubs 3 when the main carriage 74 is moved, to an operating position in which it substantially operates in the lying plane of the pancake 6 mounted on the respective support hub 3.

Preferably the reading member 103 comprises a photoelectric cell 107 provided with a photoemitter 107a designed to emit a light beam shown in dotted lines and referenced by "L", suitably inclined to the axis of the pancake 6, as well as with a photoreceiver 107b facing the photoemitter 107a so as to receive the light beam "L" emitted by the latter. The angle of inclination of the light beam "L" relative to the axis of the pancake 6 is provided to have a value in the range of 30° to 60°, and it is preferably equal to 45°.

As can be viewed from FIG. 5, the photoemitter 107a and photoreceiver 107b are located at the opposite ends 108a of a fork-shaped element 108 defining, between said ends, a housing 109 adapted to be engaged by the outer peripheral edge of the pancake 6.

When the new pancake 6 carrying the tape 7 is mounted onto the respective support hub 3 by means of the supply device 80, the additional support arm 104 is spaced apart from the pancake itself, so that the reading member 103 is in its rest position.

Once the engagement of the pancake 6 on the hub 3 has occurred, the main carriage 74 is moved along the guide bars 75 so that the reading member 103 takes a diametrical position relative to the pancake 6 from which it is moved apart.

At this point the support arm 104, upon command of the actuator 105, is moved to the front wall 4 so as to bring the reading member 103 to the working position.

The step for finding the peripheral edge of the pancake 6 then starts. To this end the main carriage 74 is moved along the guide bars 75 so that the reading member 103 is moved close to the pancake 6 at right angles to the axis of the pancake itself. Under this situation, within a more or less short period of time depending upon the diameter of the pancake 6, the peripheral edge of the pancake 6 will be introduced into the housing 109 defined between the ends 108a of the fork-shaped element 108. The photoelectric cell 107 will detect the resulting break of the light beam "L" emitted by the photoemitter 107a and will operate the reverse movement of the carriage 74. In greater detail, the carriage 74 will be shifted so that the reading member 103 may be again diametrically moved away from the pancake 6 by a predetermined amount. Said distance must be sufficient to enable the light beam "L" to be intercepted by the free portion 102b of the closure tab 102 when the latter passes between the photoemitter 107a and the photoreceiver 107b as a result of a rotation imparted to the pancake 6 by the hub 3. As soon as the light beam "L" is intercepted by the closure tab 102, the photoelectric cell 107 will stop the rotation of the pancake 6, so that the free end 102b will be disposed to a predetermined position.

At this point said setup means 110 is activated so that the use tape 7 may be engaged, as previously said, in the different members of the corresponding loading module 2. In greater detail, in the example shown the use tape 7 first passes before a control unit 111 designed to synchronize the motors respectively associated with the support hub 3 and the winding spindle 25 operating in the loading station 8 in order to cause the winding of the use tape 7 into the cassettes 9. In addition, still in known manner, the use tape 7 must pass over a counting wheel 112 designed to detect the amount of use tape which is gradually wound into each cassette 9. Finally the use tape must pass on the feed track 38 of the second guide block 37.

Referring back to FIG. 5, said setup means comprises a driving bar 114 slidably guided in a vertical direction in the additional support arm 104 through a number of rollers 113, to the lower end 114a of said bar a gripping member 115 being connected. Said gripping member 115, not described -n detail as known per se, has a pair of gripping fingers 115a which, being first located within the housing 109 defined by the fork-shaped element 108 of the reading member 103, can be moved close to each other so as to pick up the closure tab 102 at the free portion 102b thereof.

The gripping member 115 is vertically movable upon command of at least a main fluid-operated actuator 116 operating between the additional support arm 104 and the driving bar 114. Preferably an additional fluid-operated actuator 117 acting between the additional support arm 104 and the main actuator 116 is also provided in order to impart a reciprocating movement according to a predetermined path to the gripping member 115 when the driving bar 114 is held to its maximum extension condition upon the action of the main actuator. As clearly shown in FIG. 5, the additional actuator 117 acts by its rod 117a, on one end 118a of a rocker lever 118 having its fulcrum at 118c and the opposite end of which 118b is secured to the main actuator 116.

As shown in FIG. 1, an idler roller 119 is also provided which is rotatably engaged to one end of a lever 120 pivoted to the front wall 4 of the corresponding loading module 2 and movable, upon command of a fluid-operated cylinder 121, about its pivot point in order to shift the roller 119 from one working condition in which it acts against the lower peripheral edge of the pancake 6 to keep the tape 7 against said pancake, to a second working condition in which it is moved downwardly with respect to the pancake itself so as to guide the use tape 7 while the cassettes 9 are being loaded.

Once the closure tab 102 has been positioned to the predetermined point with the aid of the reading member 103, the gripping member 115, kept to its maximum raised position by the main actuator 116 and additional actuator 117, is activated, so that the gripping fingers 115a are moved close to each other and will be able to pick up the free portion 102b of the closure tab 102.

At this point the main carriage 74 is slightly shifted on the guide bars 75 to cause the detachment of the closure tab 102 from the pancake 6.

After the above operation the gripping member 115, upon the command of the main actuator 116 and optionally with the aid of the additional actuator 117, is moved downwardly as far as the driving bar 114 reaches its maximum extension condition which enables the tape 7 to be pulled in front of an access opening 11a conventionally provided in the control unit 111.

Next the main carriage 74 is moved along the guide bars 75 so as to cause a horizontal displacement of the gripping member 115 underneath the control unit 111, towards the guide blocks 36, 37. Under this situation the tape 7 is partially wound over the counting wheel 112.

During the horizontal movement of the gripping member 115 upon command of the main carriage 74 also the additional actuator 117 is operated in order to slightly raise the gripping member and enable it to ride over the guide blocks 36, 37. When the gripping member 115 has moved past the blocks 36, 37, the additional actuator 117 makes it lower again so that the tape 7 is laid onto said blocks.

At this point the gripping fingers 115a are moved apart from each other and the closure tab 102 is released. Then the actuator 105 drives the support arm 104 away from the pancake 6 and the main and additional actuators 116 and 117 respectively, bring the gripping member 115 back to the starting position, while the main carriage 74 moves backward along the guide bars 75 and brings the manipulating unit 45 again in front of the storage unit 46.

At the end of the above operation the tape 7 will be laid on the blocks 36, 37 and held thereon in known manner. Meanwhile the idler roller 119 which has been brought to its first working condition at the mounting of the pancake 6 onto the hub 3, will be brought to its second working condition in order to enable the control unit 111 to suck the tape 7 inside it in known manner, as shown in FIGS. 1 and 2.

Alternatively, it will be also possible to drive in rotation the pancake 6 before the idler roller 119 is lowered to its second working position, in order to sufficiently unwind the tape 7 such that it can be taken in by the control unit 111.

Then the tape 7 will be engaged, still in a known and conventional manner, by an additional winding member 122 associated with the extraction pin 30 and designed to wind a predetermined amount of tape 7 thereon and subsequently drop it down, after the tape has been cut in the region of blocks 36, 37, into the receptor vessel 44 associated with the respective loading module 2.

The cassette loading apparatus described herein has a productivity which is at least comparable to that of four separate loading machines known in the art, although the size and bulkiness of the apparatus is considerably less than four machines acting independently of one another.

In addition, the complete automation of the loading operation of the present invention makes the system self-contained, requiring no manual intervention for supplying the cassettes to be loaded, removing the loaded cassettes and replacing pancakes on the support hubs.

It will be recognized that although the tape loading system and apparatus described herein includes four loading modules, in fact, any number of loading modules can be used depending upon the level of productivity desired.

Although the present invention has been described with reference to a specific embodiment, neither the specifically described method of operation, nor the specific structure described should be construed as limiting since the disclosed embodiment is merely illustrative of the invention. One of skill in the art may alter the described embodiment without departing from the spirit or scope of the invention.

What is claimed is:

1. A tape loading apparatus comprising:
    a plurality of independently operating loading modules for loading tape into cassettes, each communicating with a common microprocessor which controls the operation of each said loading module, wherein each said loading module comprises:
    at least one support hub for rotatably supporting at least one reel of use tape,
    cassette support means for releasably supporting a cassette in a loading position, to be loaded with tape from said reel of use tape,
    winding means for winding tape into a cassette supported by said support means,
    extraction means for extracting the leader tape from said cassette to be loaded, and
    splicing means for splicing an end of tape from said reel of use tape to the leader tape extracted from each said cassette;
    a magazine releasably holding a plurality of supply reels filled with magnetic tape;
    a movably mounted manipulating unit selectively movable relative to said magazine and said loading modules comprising:
    at least two support arms associated with a main carriage, each of said support arms carrying a grasping and release member wherein at least one of said grasping and release members automatically removes an out of tape reel from any one of said support hubs on any one of said plurality of loading modules, and wherein at least one of said grasping and release members automatically picks up a new supply reel from said magazine and mounts it onto any one of said support hubs,
    search means for locating a free end associated with the tape wound onto the new supply reel mounted on said support hub, and
    tape threading means for engaging said free end located by said search means and guiding it in a predetermined path to put the tape in operating engagement with said splicing means on the corresponding loading module.

2. An apparatus according to claim 1, further comprising cassette supply means, wherein said cassette supply means comprises:
    a main conveyor capable of carrying a plurality of cassettes from a remote location to the tape loading apparatus;
    a plurality of in-feed conveyors each corresponding to one of said loading modules and each extending at substantially right angles from said main conveyor;
    a plurality of thrust elements each capable of operatively engaging a cassette carried by said main conveyor to transfer said cassette from said main conveyor to one of said in-feed conveyors; and
    a plurality of rotating members each corresponding to one of said loading modules for transferring cassettes from said in-feed conveyors to feed guides for guidance to said loading position.

3. An apparatus according to claim 2, further comprising a stop partition associated with said main conveyor to provide a fixed point behind which the cassettes carried by said main conveyor achieve abutting relation.

4. An apparatus according to claim 2, wherein each of said rotating members includes an element in the form of a sector of a solid cylinder rotationally operable between a first position in which a face of said sector-shaped element is in coplanar alignment with said in-feed conveyor and a second position in which said face of said sector-shaped element is in alignment with said feed guides to place the cassettes in position along said feed guides.

5. An apparatus according to claim 4, wherein each said sector-shaped element further includes a curved face capable of acting as an abutment seat for one of said cassettes carried by said in-feed conveyors when said sector-shaped element moves between said first and second positions.

6. An apparatus according to claim 1, further comprising receptor means for receiving cassettes from said loading position, wherein said receptor means comprises:
an out-feed conveyor; and
a plurality of discharge chutes each corresponding to one of said loading modules to individually transfer each cassette released from each said loading position to said out-feed conveyor.

7. An apparatus according to claim 6, wherein said receptor means further comprises a deflector plate located intermediate each said loading position and each said discharge chute and movable from one position in which it obliquely projects from the front wall of the loading module in order to guide the cassettes coming from the loading position to said discharge chute, to a second position in which it is disposed in coplanar relation with said front wall so as to drop each cassette down to a reception vessel located under the loading position.

8. An apparatus according to claim 6, wherein said receptor means further comprises a plurality of stop members each driven by a respective fluid-operated cylinder to halt the flow of cassettes to keep said out-feed conveyor clear to allow cassettes to be discharged from said discharge chutes without interference.

9. An apparatus according to claim 1, wherein each of said loading modules further comprises a pair of feed guides capable of slidably engaging cassettes coming from a supply means, wherein said feed guides comprise respective oblique portions adapted to impart and maintain an horizontally inclined orientation to the individual cassettes when they move to and are located in said loading position.

10. An apparatus according to claim 1, wherein said main carriage is slidably guided in a direction at right angles to the axes of said support hubs
and wherein said support arms, carrying said grasping and release members, are moveable close to and away from the front walls of said tape loading modules to allow said grasping and release members to selectively engage said magazine and said support hubs.

11. An apparatus according to claim 1, wherein said main carriage further comprises at least a third support arm operatively interacting with said first two support arms, wherein said third support arm is movable close to and away from the walls of said tape loading modules, and wherein said third support arm operatively carries said search means and said tape threading means.

12. An apparatus according to claim 11, wherein said search means comprises a reading member adapted to be moved close to and away from the axis of the supply reel in order to operatively engage the end of the magnetic tape of said reel and to cause the locking of the supply reel in such a manner that the end of the magnetic tape is disposed in a predetermined position.

13. An apparatus according to claim 12, wherein said reading member comprises a photoelectric cell having a photoemitter and a photoreceiver secured to the opposite ends of a fork-shaped element defining, between said opposite ends, an engagement seat for the peripheral edge of said supply reel.

14. An apparatus according to claim 11, wherein said tape threading means comprises a gripping member capable of picking up a free end extending outwardly from said supply reel of magnetic tape, wherein said gripping member is movable at right angles to the movement direction of said main carriage so as to thread the magnetic tape between members of the corresponding loading module to put the tape in operating engagement with said splicing means, in movements synchronized with those carried out by said main carriage.

* * * * *